United States Patent
Peters et al.

(10) Patent No.: US 9,551,456 B2
(45) Date of Patent: Jan. 24, 2017

(54) BELLEVILLE WASHER NUT PLATE

(71) Applicant: United Technologies Corporation, Hartford, CT (US)

(72) Inventors: Donald W. Peters, Colchester, CT (US); Brandon T. Slaney, West Hartford, CT (US); Gonazlo F. Martinez, Jr., Stuart, FL (US)

(73) Assignee: United Technologies Corporation, Farmington, CT (US)

( * ) Notice: Subject to any disclaimer, the term of this patent is extended or adjusted under 35 U.S.C. 154(b) by 73 days.

(21) Appl. No.: 14/612,453

(22) Filed: Feb. 3, 2015

(65) Prior Publication Data

US 2016/0223133 A1    Aug. 4, 2016

(51) Int. Cl.
| | |
|---|---|
| F16B 39/284 | (2006.01) |
| F16M 13/02 | (2006.01) |
| F16F 15/04 | (2006.01) |
| F16B 37/04 | (2006.01) |
| F16B 5/02 | (2006.01) |

(52) U.S. Cl.
CPC ............ *F16M 13/02* (2013.01); *F16B 5/0241* (2013.01); *F16B 37/044* (2013.01); *F16F 15/04* (2013.01)

(58) Field of Classification Search
CPC .......... F16M 13/02; F16F 15/04; F16B 39/284
USPC .................................. 411/103, 111, 112–113
See application file for complete search history.

(56) References Cited

U.S. PATENT DOCUMENTS

| 360,091 A | * | 3/1887 | Gienty | .................... F16B 39/24 411/136 |
| 623,008 A | | 4/1899 | Greb et al. | |
| 2,409,209 A | * | 10/1946 | Johnson | ................. F16B 37/044 411/111 |
| 2,451,991 A | * | 10/1948 | Arent | ..................... F16B 37/044 411/103 |
| 2,815,789 A | * | 12/1957 | Hutson | ................. F16B 37/044 411/111 |
| 3,978,761 A | * | 9/1976 | Sosinski | ............... F16B 31/021 206/338 |
| 4,193,435 A | * | 3/1980 | Frosch | .................. F16B 37/044 411/103 |
| 4,341,968 A | | 7/1982 | Borden et al. | |
| 4,571,133 A | * | 2/1986 | Lindow | ................... F16B 31/04 411/11 |
| 4,647,263 A | | 3/1987 | Macfee, Jr. et al. | |
| 4,900,209 A | * | 2/1990 | Reynolds | .............. F16B 37/044 411/112 |
| 4,940,377 A | | 7/1990 | Reynolds | |
| 5,066,180 A | * | 11/1991 | Lang | ..................... F16B 37/122 411/103 |
| 5,316,319 A | * | 5/1994 | Suggs | ................... F04D 29/102 251/214 |

(Continued)

FOREIGN PATENT DOCUMENTS

JP      2002138797 A    5/2002

OTHER PUBLICATIONS

Extended European Search Report, for European Patent Application No. 16154032.3, dated May 16, 2016, 8 pages.

*Primary Examiner* — Roberta Delisle (74) *Attorney, Agent, or Firm* — Kinney & Lange, P.A.

(57) ABSTRACT

An apparatus includes a nut plate with a plurality of retention tabs integrally attached to the nut plate. A spring assembly is contained with the plurality of retention tabs. The apparatus also includes a nut retained by the retention tabs.

15 Claims, 11 Drawing Sheets

(56) References Cited

U.S. PATENT DOCUMENTS

| | | | |
|---|---|---|---|
| 6,811,129 B2 | 11/2004 | Kimura | |
| 6,979,158 B2 * | 12/2005 | Clinch | F16B 37/068 411/111 |
| 7,153,054 B2 * | 12/2006 | Arbona | B62D 29/048 403/28 |
| 7,191,991 B2 | 3/2007 | Kimura | |
| 8,281,603 B2 * | 10/2012 | Johnson | F02K 9/62 411/424 |
| 8,490,595 B2 | 7/2013 | Bittner et al. | |
| 8,591,157 B1 * | 11/2013 | Stewart | F16B 31/02 411/10 |
| 8,911,191 B2 | 12/2014 | James | |
| 2006/0188357 A1 * | 8/2006 | Rowe | F16B 37/044 411/119 |
| 2014/0314547 A1 | 10/2014 | Sander et al. | |

* cited by examiner

BELLEVILLE WASHER NUT PLATE

BACKGROUND

The present disclosure relates to the field of nut plates, and more particularly to a nut plate assembly including a Belleville washer stack.

A typical gas turbine engine operates in an extremely harsh environment characterized by very high temperatures and vibrations. A conventional gas turbine engine includes a compressor for compressing entering air, a combustor for mixing and burning the compressed gases that emerge from the compressor with fuel, a turbine for expanding the hot gases to generate thrust to propel the engine, and an exhaust nozzle for allowing hot gases to exit the engine. Thus, the exhaust nozzle must accommodate extremely hot gases exiting the engine. Other considerations critical to engine design are avoiding air leakage and insulating certain engine components from exposure to hot gases.

In certain areas exposed to these hot exhaust gases, specialized materials are used that can withstand hot temperatures. Such specialized materials, although especially resistant to temperature, can be susceptible to fracture or cracking when attachment means, such as bolt and nut assemblies, are placed under a high level of torque.

Additionally, a typical gas turbine engine also includes many areas where access to a nut and bolt assembly is only available from one side of the assembly. A nut plate is often used to obviate the need to apply torque to the nut in order to engage the bolt with the nut in these problematic areas.

SUMMARY

An apparatus includes a nut plate with a plurality of retention tabs integrally attached to the nut plate. A spring assembly is contained with the plurality of retention tabs. The apparatus also includes a nut retained by the retention tabs.

A nut plate assembly includes a nut plate with retention tabs. The retention tabs contain a spring assembly. The retention tabs also include retaining clips that retain a nut. The nut plate assembly also include a bolt that extends through the nut plate, the spring assembly, and the nut. The bolt threadably engages with the nut.

DETAILED DESCRIPTION

In a gas turbine engine, Belleville washers can be a useful tool to help prevent fracturing or cracking of the thermally specialized, and often times brittle, materials. Belleville washers can maintain a near constant spring rate during all engine operating conditions, regardless of the thermal expansion and contraction of engine elements, and during oscillations due to engine vibration. Combining Belleville washers with nut plates allow for the use of Belleville washers in areas of the engine where a constant spring rate of the nut plate is desired and where there is access only to the bolt side of the nut plate assembly.

Figure 1A:
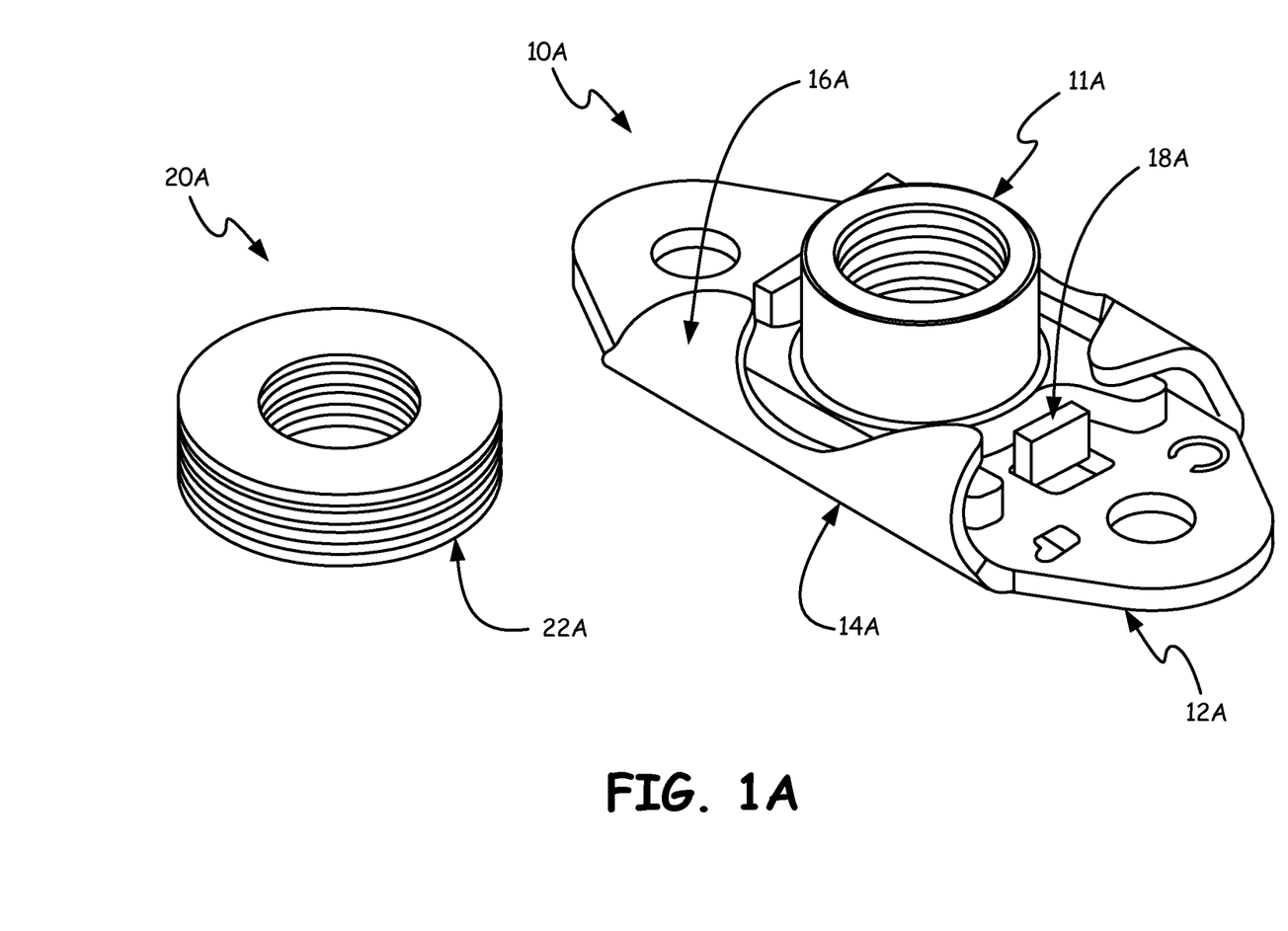
FIG. 1A is a perspective view of a nut plate assembly.

FIG. 1A is a perspective view of nut plate assembly 10A. Nut plate assembly 10A includes nut 11A and nut plate 12A. Retention tabs 14A are integrally attached to and extend upward from nut plate 12A. Retention tabs 14A include retaining clips 16A located at a distal end of retention tabs 14A. Lateral retention tabs 18A also extend upward from nut plate 12A. FIG. 1A also includes spring assembly 20A. Spring assembly 20A consists of Belleville washers 22A.

Nut 11A is positioned on nut plate assembly 10A such that retention tabs 14A retain nut 11A to remain in close proximity to nut plate 12A during both use and non-use of nut plate assembly 10A. The configuration of nut plate assembly 10A allows for nut plate 12A to absorb torque received by nut 11A when nut 11A is threadably engaged with a bolt. Retention tabs 14A prevent nut 11A from twisting relative to nut plate 12a, therefore obviating the need for a user to manually secure, or apply torque to, nut 11A when threadably engaging nut 11A with a bolt. As will be shown in later embodiments, nut plate 12A is often fastened to another element of the engine in order to provide the structural stability necessary to absorb the torque from nut 11A nut plate 12A.

Belleville washers 22A are a type of spring element shaped like a regular washer, but also include a frusto-conical shape. The frusto-conical shape of Belleville washers 22A provides a spring characteristic to Belleville washers 22A. The spring characteristic of Belleville washers 22A functions as a dampening element and can be used to provide a pre-load force to a bolted joint or bearing. Belleville washers 22A are also known as spring washers, conical washers, conical springs, conical spring washers, coned-disc springs, Belleville springs, and/or cupped spring washers.

Figure 1B:
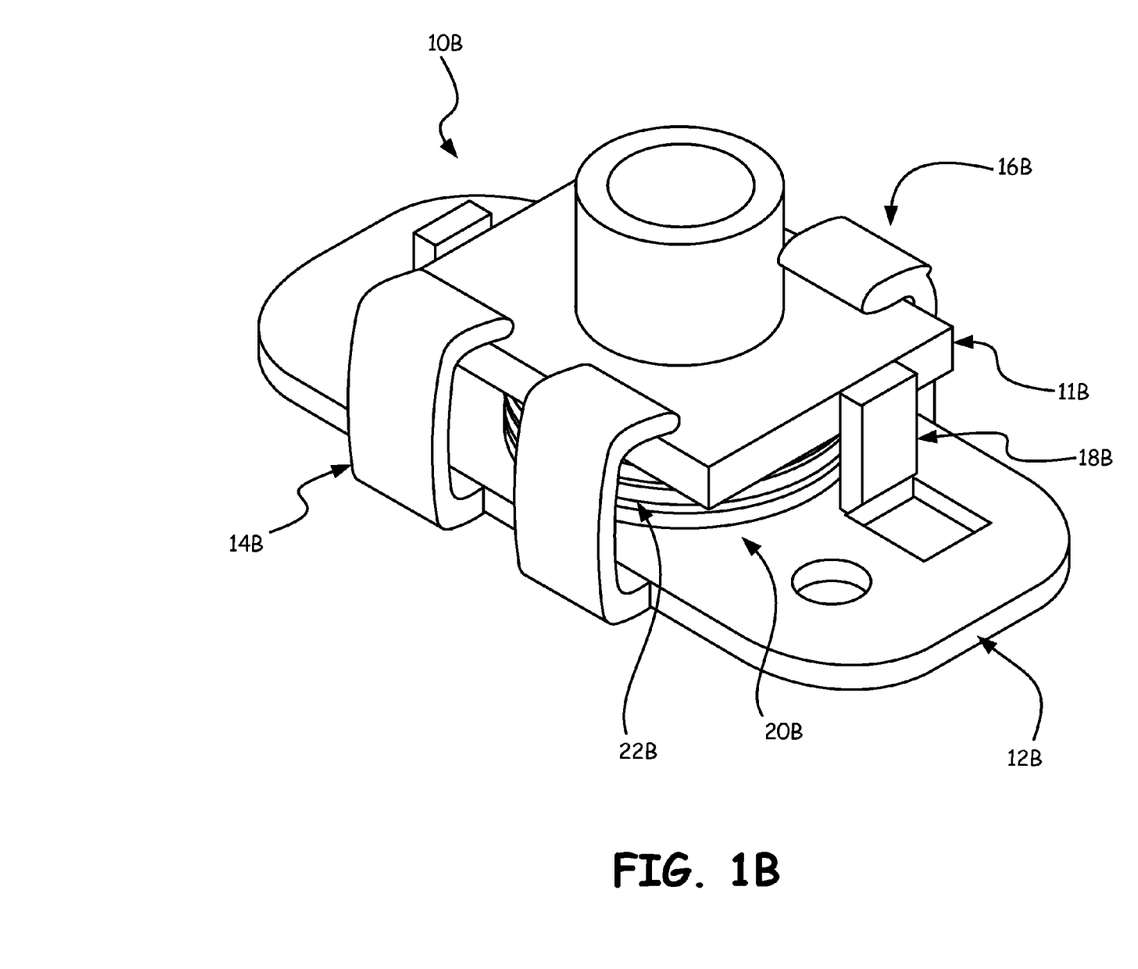
FIG. 1B is a perspective view of a nut plate assembly.

FIG. 1B is a perspective view of a nut plate assembly. Nut plate assembly 10B includes nut 11B and nut plate 12B. Retention tabs 14B are integrally attached to and extend upward from nut plate 12B. Retention tabs 14B include retaining clips 16B located at a distal end of retention tabs 14B. Retention tabs 18B also extend upward from nut plate 12B. Retention tabs 14B are positioned around a perimeter of nut 11B and retain nut 11B by holding nut 11B in place with retaining clips 16B. Retention tabs 18B also retain nut 11B in place by inhibiting lateral motion of nut 11B relative to nut plate 12B. Retention tabs 14B also retain spring assembly 20B, consisting of Belleville washers 22B, in place relative to nut plate 12B.

Spring assembly 20B can be made up of Belleville washers 22B or other types of spring-like elements, such as spring washer, conical springs, and other types of non-coil flexible washers. Spring assembly 20B can consist of one or multiple Belleville washers. Belleville washers 22B can be in series or parallel. The spring rate of spring assembly 20B can be tailored by the number and configuration of Belleville washers 22B. Although this embodiment shows four Belleville washers 22B, other combinations may include more or fewer Belleville washers 22B oriented in similar or different directions as Belleville washers 22B shown in FIG. 1B.

The pre-load force on spring assembly 20B may be adjusted by varying the size, quantity, and configuration of Belleville washers 22B. The size, quantity, and configuration of Belleville washers 22B are selected to provide the necessary load required throughout engine operation, while remaining in a linear spring resiliency range. The load provided by Belleville washers 22B therefore remains consistent for all operating conditions of the engine.

The spring rate of spring assembly 20B is also determined by factors such as the inner and outer diameters of Belleville washers 22B, as well as the conical slant or slope of Belleville washers 22B. These factors can be modified to tune the spring constant and amount of deflection of Belleville washers 22B. Additionally, the thickness and material of Belleville washers can be selected to achieve a desired spring rate of Belleville washers 22B.

Configuring nut plate 12B to retain both nut 11B and spring assembly 20B allows for nut plate assembly 10B to be sold and used as an inseparable assembly. The inseparability of nut plate assembly 10B prevents disassembly and/or missasembly of Belleville washers 22B during engine assembly and repair. If during assembly of Bellville washers 22B, Bellville washers 22B are not ordered correctly, the spring rate of spring assembly 20B will not be per the original design intent of spring assembly 20B.

Additionally, being a nut plate, nut plate 12B requires no access from the nut side of nut plate assembly 10B, which is of particular advantage in those areas of the engine where access to both sides of nut plate assembly 10B would be limited.

Figure 2A:
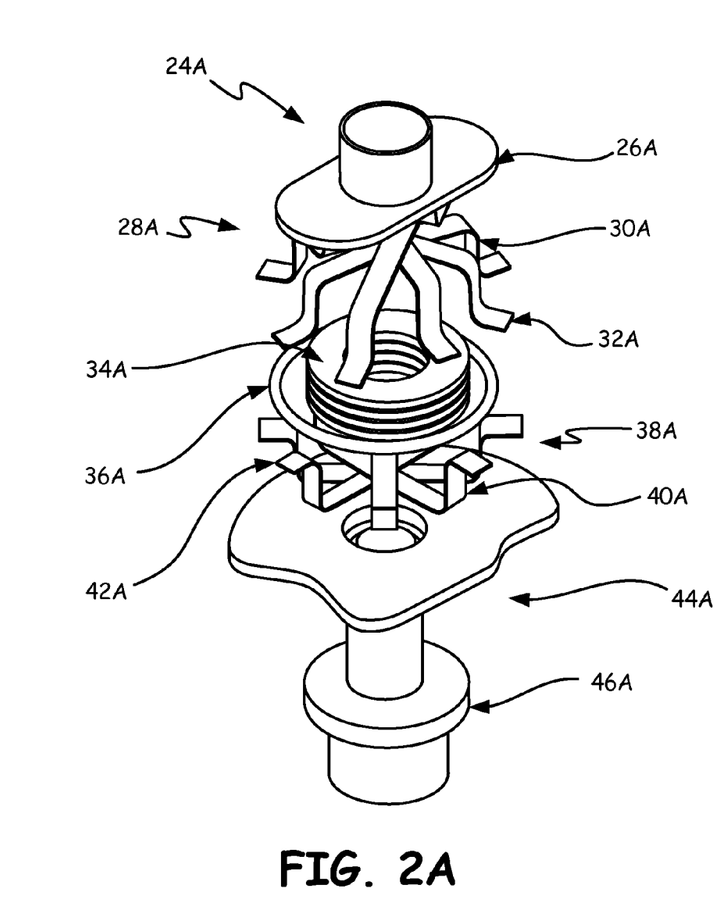
FIG. 2A is an exploded perspective view of a nut plate assembly according to a second embodiment.

FIG. 2A is an exploded perspective view of nut plate assembly 24A according to a second embodiment. Nut plate assembly 24A includes nut 26A, upper cage 28A, Belleville washers 34A, retaining ring 36A, lower cage 38A, base 44A, and bolt 46A. Upper cage 28A includes upper cage arms 30A with upper cage arm distal ends 32A located at the distal ends of upper cage arms 30A. Upper cage arm distal ends 32A extend radially outward from upper cage 28A. Lower cage 38A includes lower cage arms 40A with lower cage arm distal ends 42A located at the distal ends of lower cage arms 40A. Lower cage arm distal ends 42A extend radially outward from lower cage 34A. Retaining ring 36A is positioned between upper cage 28A and lower cage 34A. Retaining ring 36A is positioned around and co-axial with Belleville washers 34A. The inner diameters of both upper cage 28A and lower cage 38A are greater than the outer diameter of Belleville washers 34A such that when nut plate assembly 24A becomes assembled, Belleville washers 34A will be retained within upper cage 28A and lower cage 38A.

Figure 2B:
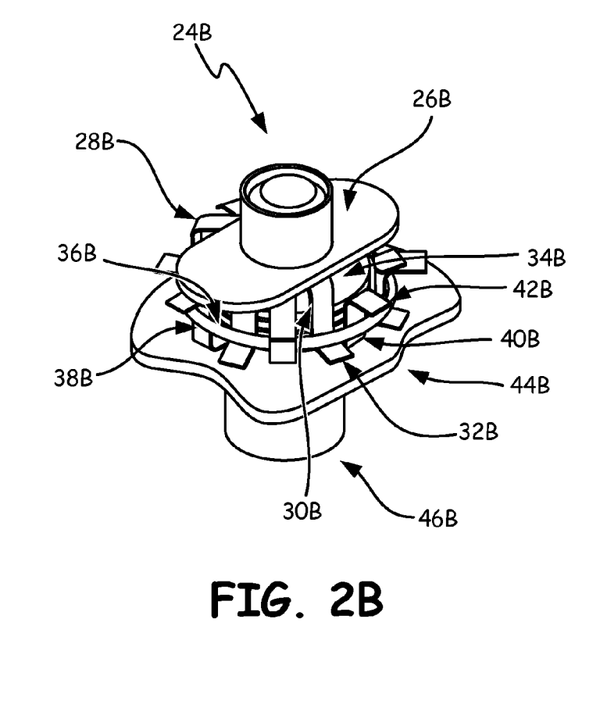
FIG. 2B is a perspective view of a nut plate assembly according to a second embodiment.

FIG. 2B is a perspective view of nut plate assembly 24B according to the second embodiment. Nut plate assembly 24B includes an assembled version of nut plate assembly 24A seen in FIG. 2A. In FIG. 2B, upper cage 28B is affixed to nut 24B and lower cage 34B is affixed to base 44B with fasteners, which can include rivets. Bolt 46B extends through the middle of each of nut 24B, upper cage 28B, Belleville washers 34B, retaining ring 36B, lower cage 38B, and base 44B.

Belleville washers 34B are retained within upper cage arms 30B and lower cage arms 40B. Upper cage arms 30B are positioned in the spacings between lower cage arms 40B, and lower cage arms 40B are positioned in the spacings between upper cage arms 30B. Upper cage arms 30B engage with retaining ring 36B by interlocking upper cage arm distal ends 32B with retaining ring 36B. Upper cage arm distal ends 32B interlock with retaining ring 36B by hooking underneath retaining ring to prevent upper cage 28B from movement away from retaining ring 36B. Lower cage arms 40B engage with retaining ring 36B by interlocking lower cage arm distal ends 42B with retaining ring 36B. Lower cage arm distal ends 42B interlock with retaining ring 36B by hooking above retaining ring to prevent lower cage 38B from movement away from retaining ring 36B.

Bolt 46B is threadably engaged with nut 26B. When assembled, nut plate assembly 24B compresses Belleville washers 34B and a specific spring rate of Belleville washers 34B can be selected. The spring rate of Belleville washers 34B can be adjusted by either increasing or decreasing the amount of torque applied to bolt 46B. As the torque applied to bolt 46B increases, Belleville washers 34B compress and increase the spring rate of Belleville washers 34B. As the torque applied to bolt 46B decreases, Belleville washers 34B decompress and decrease the spring rate of Belleville washers 34B.

Figure 3A:
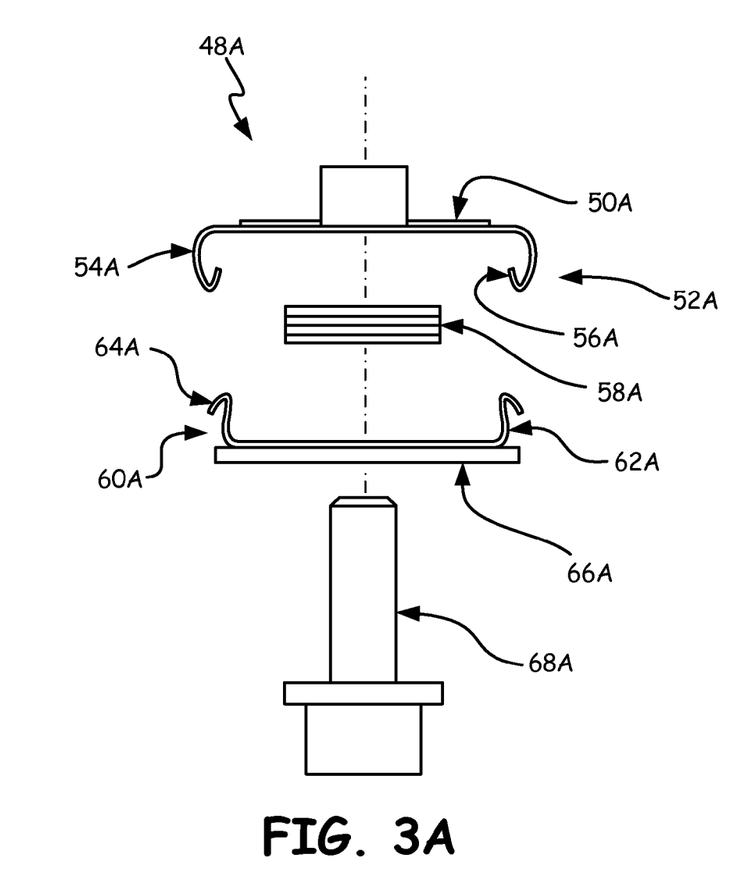
FIG. 3A is an exploded elevation view of a nut plate assembly according to a third embodiment.

FIG. 3A is an exploded elevation view of nut plate assembly 48A according to a third embodiment. Nut plate assembly 48A includes nut 50A, upper cage 52A, Belleville washers 58A, lower cage 60A, base 66A, and bolt 68A. Upper cage 52A includes upper cage arms 54A with upper cage arm distal ends 56A located at the distal ends of upper cage arms 54A. Upper cage arm distal ends 56A extend radially inward to upper cage 52A and form an acute angle with each of respective upper cage arms 54A. Lower cage 60A includes lower cage arms 62A with lower cage arm distal ends 64A located at the distal ends of lower cage arms 62A. Lower cage arm distal ends 44A extend radially inward to lower cage 60A and form an acute angle with each of respective lower cage arms 62A. Upper cage 52A and lower cage 60A are positioned around and co-axial with Belleville washers 58A. The inner diameters of both upper cage 52A and lower cage 60A are greater than the outer diameter of Belleville washers 58A such that when nut plate assembly 48A becomes assembled, Belleville washers 58A will be retained within upper cage 52A and lower cage 60A.

Figure 3B:
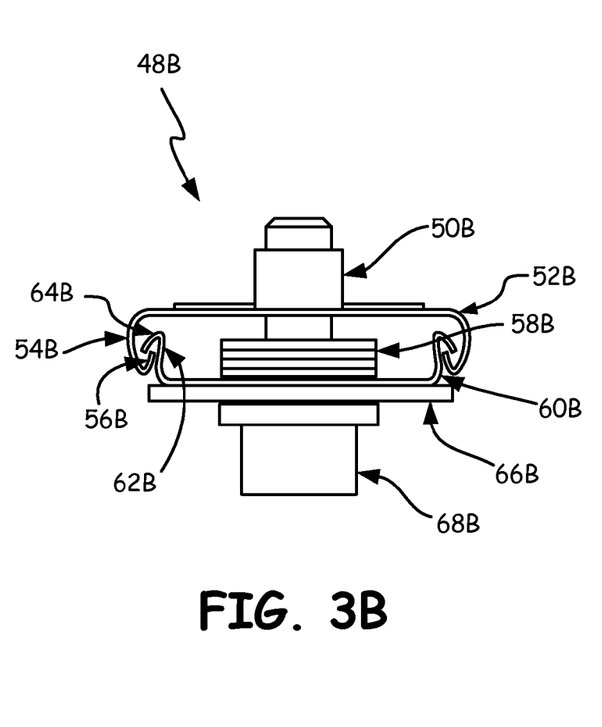
FIG. 3B is an elevation view of a nut plate assembly according to a third embodiment.

FIG. 3B is an elevation view of nut plate assembly 48B according to the third embodiment. Nut plate assembly 48B includes an assembled version of nut plate assembly 48A seen in FIG. 3A. In FIG. 3B, upper cage 52B is affixed to nut 50B and lower cage 60B is affixed to base 66B with fasteners, which can include rivets. Bolt 68B extends through the middle of each of nut 50B, upper cage 52B, Belleville washers 58B, lower cage 60B, and base 66B.

Belleville washers 58B are retained within upper cage arms 54B and lower cage arms 62B. Upper cage arms 54B engage with lower cage arms 62B by interlocking upper cage arm distal ends 56B with lower cage arm distal ends 64A. Upper cage arm distal ends 32B interlock with lower cage arm distal ends 64A by hooking upper cage arm distal ends 32B with lower cage arm distal ends 64A to prevent upper cage 52B from movement away from lower cage 60B. The relative angle between respective upper cage arms 54B and upper cage arm distal ends 56B, as well as the relative angle between respective lower cage arms 62B and lower cage arm distal ends 64B, allows upper cage arm distal ends 56B and lower cage arm distal ends 64A to clip into each other to prevent each of upper cage 52B and lower cage 60B from separating.

The third embodiment of the present disclosure shown in FIG. 3B provides an example of spring rate that can be varied less than the embodiment shown in FIGS. 2A-2B. Nut plate assembly 48B contains a substantially constant spring rate because of the engagement interface between upper cage 52B and lower cage 60B. Upper cage 52B and lower cage 60B are designed such that once a certain level of spring rate is reached by Belleville washers 58B through providing torque to bolt 68B, upper cage arm distal ends 56B and lower cage arm distal ends 64B will engage each other to prevent nut assembly 48B from decompressing.

Figure 4A:
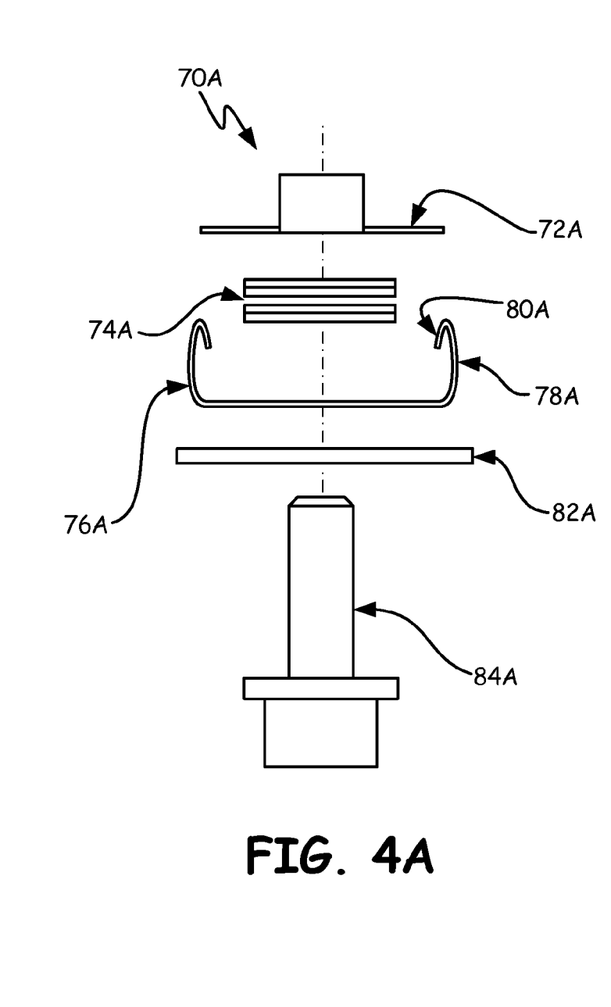
FIG. 4A is an exploded elevation view of a nut plate assembly according to a fourth embodiment.

FIG. 4A is an exploded elevation view of nut plate assembly 70A according to a fourth embodiment. Nut plate assembly 70A includes nut 72A, Belleville washers 74A, lower cage 76A, base 82A, and bolt 84A. Lower cage 76A includes lower cage arms 78A with lower cage arm distal ends 80A located at the distal ends of lower cage arms 78A. Lower cage arm distal ends 80A extend radially inward to lower cage 76A and form an acute angle with each of respective lower cage arms 78A. Lower cage 76A is positioned around and co-axial with Belleville washers 74A. The inner diameter of lower cage 76A is greater than the outer diameter of Belleville washers 74A such that when nut plate assembly 70A becomes assembled, Belleville washers 74A will be retained within lower cage 76A.

Figure 4B:
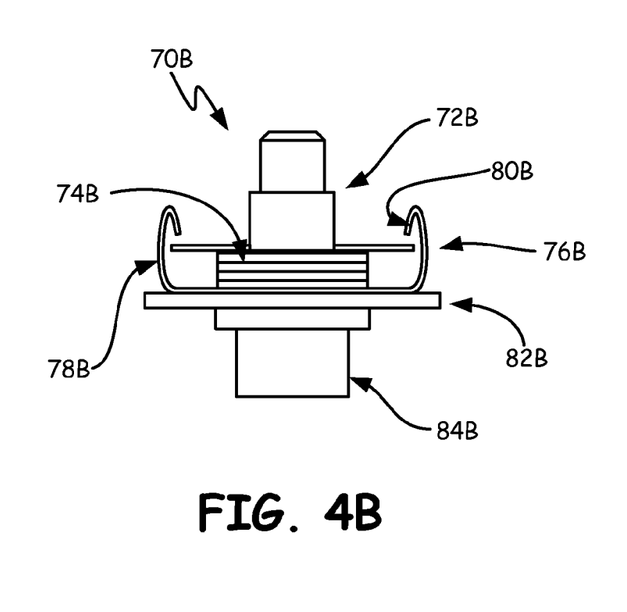
FIG. 4B is an elevation view of a nut plate assembly according to a fourth embodiment.

FIG. 4B is an elevation view of nut plate assembly 70B according to the fourth embodiment. Nut plate assembly 70B includes an assembled version of nut plate assembly 70A seen in FIG. 4A. In FIG. 4B, lower cage 76B is affixed to base 82B with an attachment means, which may include rivets, welds, adhesives, or other mechanical fasteners. Bolt 84B extends through the middle of each of nut 72B, Belleville washers 74B, lower cage 76B, and base 682B.

Belleville washers 74B are retained within lower cage arms 78B. Lower cage arms 78B engage with nut 72B by clipping lower cage arm distal ends 80A onto nut 72B. Lower cage arm distal ends 80A clip onto nut 72B by hooking lower cage arm distal ends 80A with nut 72B to prevent nut 72B from movement away from lower cage 76B. The relative angle between respective lower cage arms 78B and lower cage arm distal ends 80B allows lower cage arm distal ends 80B to clip onto the edge of nut 72B to prevent each of nut 72B and lower cage 76B from separating.

Nut plate assembly 70B contains a substantially constant spring rate because of the engagement interface between nut 72B and lower cage 76B. Nut plate assembly 70B is designed such that once a certain level of spring rate is reached by Belleville washers 74B through providing torque to bolt 84B, nut 72B and lower cage arm distal ends 80 will engage each other to prevent nut assembly 70B from decompressing.

Figure 5A:
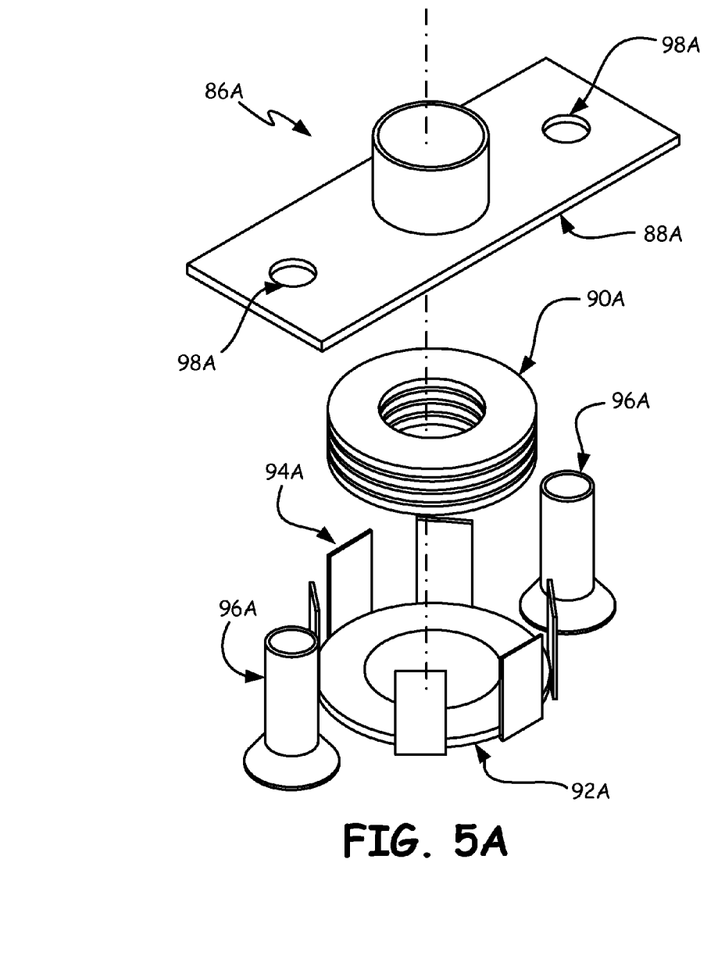
FIG. 5A is an exploded perspective view of a nut plate assembly according to a fifth embodiment.

FIG. 5A is an exploded perspective view of nut plate assembly 86A according to a fifth embodiment. Nut plate assembly 86A includes nut 88A, Belleville washers 90A, lower cage 92A, and rivets 96A. Lower cage 92A includes lower cage arms 94A. Lower cage 92A is positioned around and co-axial with Belleville washers 90A. The inner diameter of lower cage 92A is greater than the outer diameter of Belleville washers 90A such that when nut plate assembly 86A becomes assembled, Belleville washers 90A will be retained within lower cage 92A. Nut 88A includes holes 98A configured to receive rivets 96A during assembly of nut plate assembly 86A.

Figure 5B:
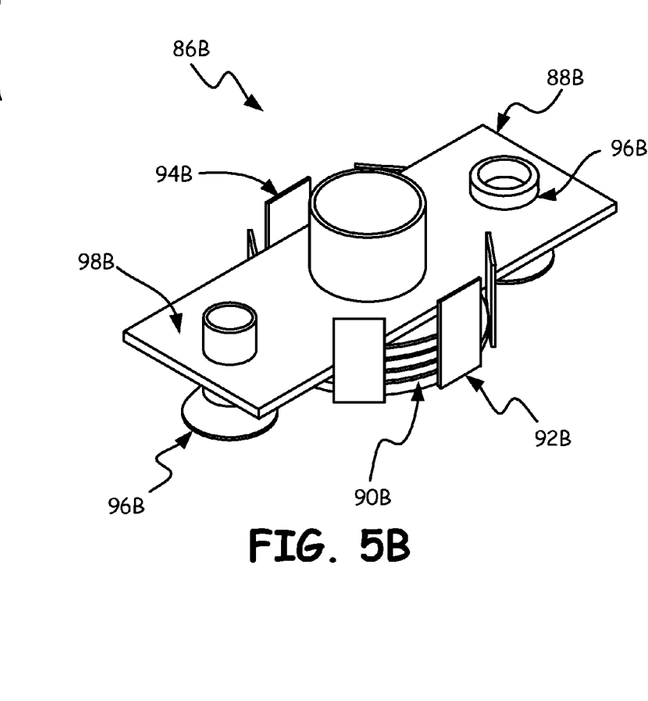
FIG. 5B is a perspective view of a nut plate assembly according to a fifth embodiment.

FIG. 5B is a perspective view of nut plate assembly 86B according to the fifth embodiment. Nut plate assembly 86B includes an assembled version of nut plate assembly 86A seen in FIG. 5A. Belleville washers 90B are retained within lower cage arms 94B. In FIG. 5B, rivets 96B extends through holes 98B. Rivets 96B are secured to nut 88B so as to mechanically fasten nut 88B and rivets 96B together. Once fastened, rivets 96B prevent nut 88B from movement away from lower cage 92B.

Nut plate assembly 86B contains a substantially constant spring rate because of the engagement interface between nut 88B and lower cage 92B. Nut plate assembly 86B is designed such that once a certain level of spring rate is reached by Belleville washers 90B, rivets 96B are riveted to attached nut 88B to rivets 96B to prevent nut assembly 86B from decompressing.

Figure 6A:
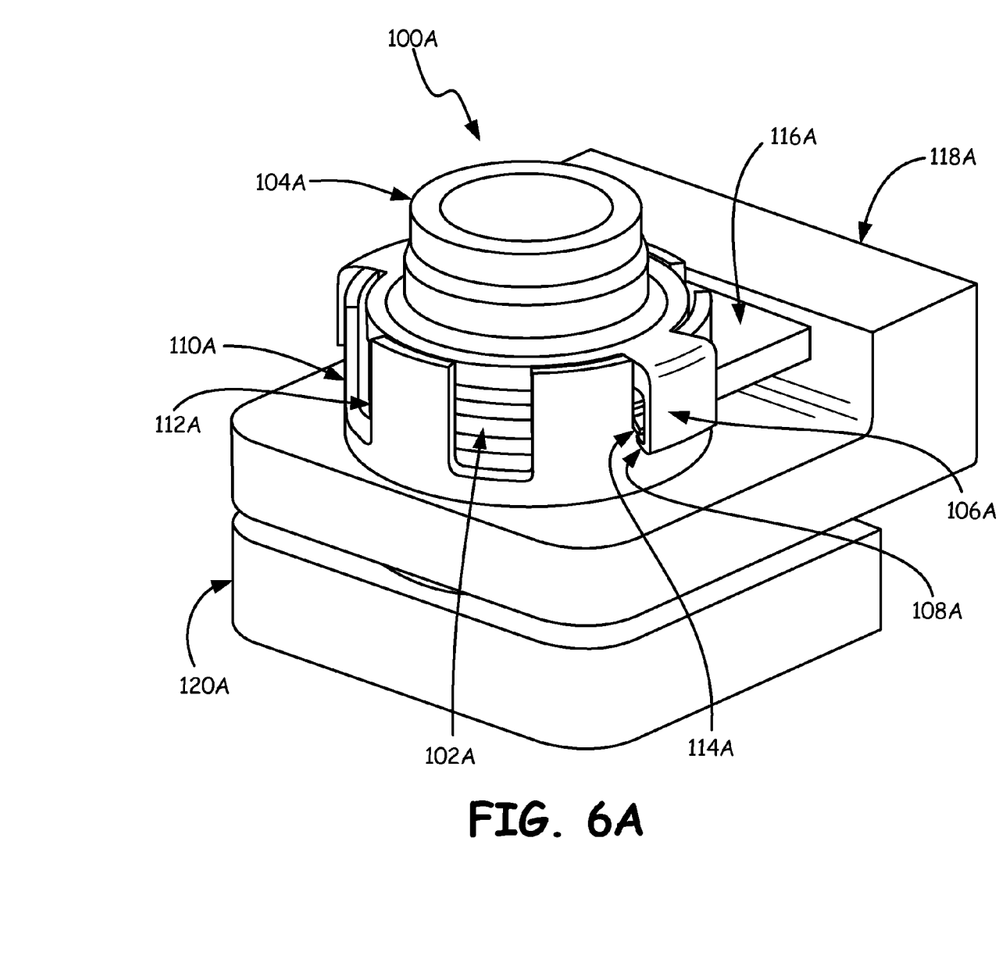
FIG. 6A is a perspective view of a nut plate assembly according to a sixth embodiment.

FIG. 6A is a perspective view of nut plate assembly 100A according to a sixth embodiment. Nut assembly 100A includes Belleville washers 102A, nut 104A, lower cage 110A, backbone 118A, and liner 120A. Nut 104A includes nut arms 106A with nut retaining clips 108A. Lower cage 110A includes lower cage arms 112A with lower cage retaining clips 114A. Lower cage 110A also includes anti-rotation feature 116A which prevents nut 104A from twisting relative to backbone 118A.

Belleville washers 102A are retained within lower cage arms 112A. Nut 104A engages with lower cage arms 112A by interlocking nut retaining clips 108A and lower cage retaining clips 114A. Nut retaining clips 108A interlock with lower cage retaining clips 114A by hooking nut retaining clips 108A with lower cage retaining clips 114A to prevent nut 104A from movement away from lower cage 110A. The relative angle between respective nut arms 106A and nut retaining clips 108A, as well as the relative angle between respective lower cage arms 122A and lower cage retaining clips 114A, allows nut retaining clips 108A and lower cage retaining clips 114A to clip into each other to prevent each of nut 104A and lower cage 110A from separating. This prevention in separation maintains retention of Belleville washers 102A within nut plate assembly 100A during assembly and disassembly of nut plate assembly 100A.

Anti-rotation feature 116A of lower cage 110A prevents nut 104A from twisting relative to backbone 118A. This configuration allows torque to be transferred from a bolt (not shown in FIG. 6A) to nut 104A, then to lower cage 110A, and then into backbone 118A. This transfer of torque allows the bolt to be accessed and/or removed from a hot side of liner 120A and still allow retention of Belleville washers in nut plate assembly 110A without having Belleville washers 102A getting lost in the engine upon removal of the bolt.

Figure 6B:
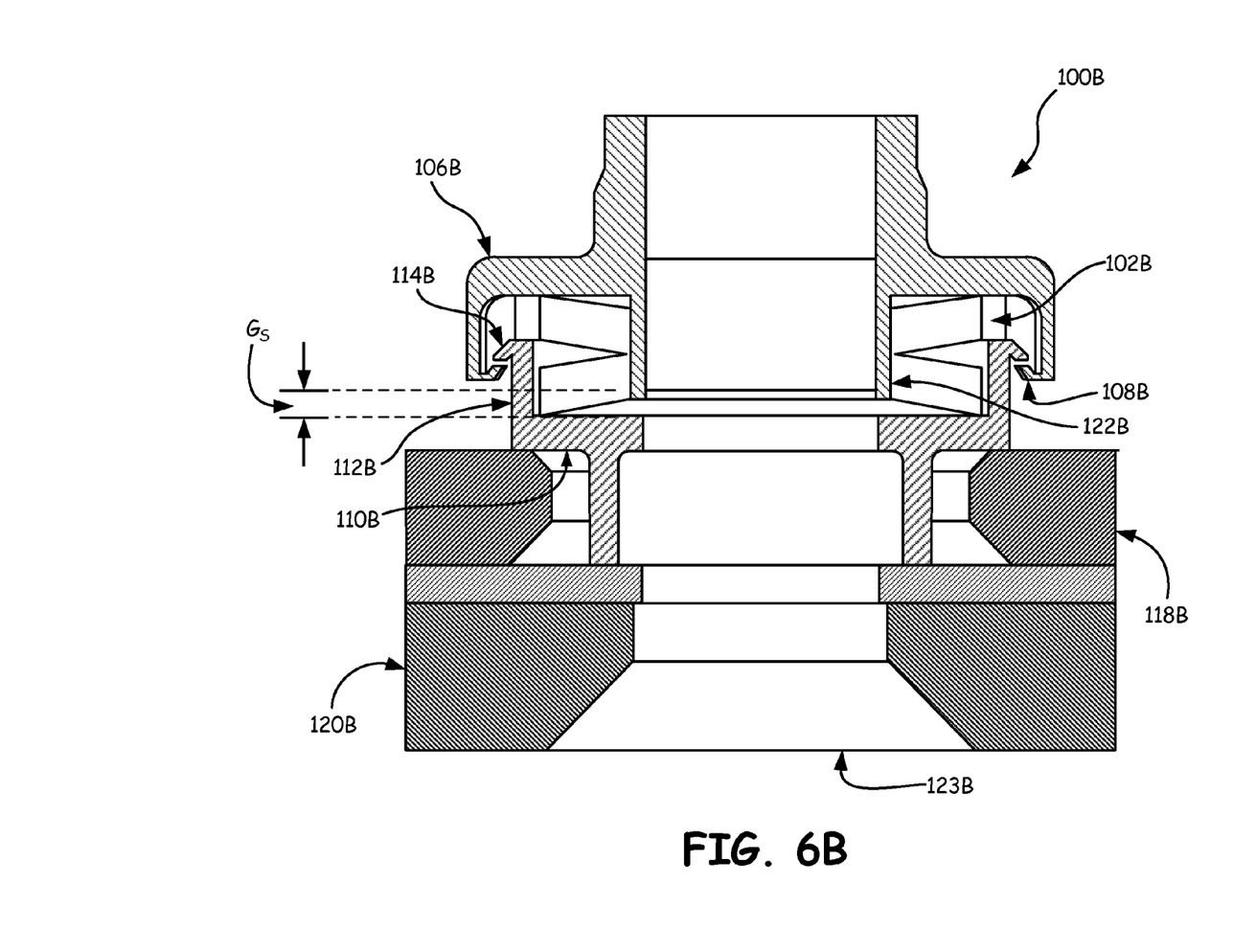
FIG. 6B is a cross-sectional view of a nut plate assembly according to a sixth embodiment.

FIG. 6B is a cross-sectional view of nut plate assembly 100B according to the sixth embodiment. As compared to nut plate assembly 100A presented in FIG. 6A, nut plate assembly 100B includes stop 122B that extends from nut 104B. The length of stop 122B is configured to come into contact with lower cage 110B when a specific level of torque is applied to bolt 123B. Stop 122B prevents over-compression of Belleville washers 102B past a specific amount of compression designated by desired operating characteristics of nut plate assembly 100B. Gap $G_S$ extends between a bottom edge of stop 122B and a base portion of lower cage 110B. Gap $G_S$ can be designed to allow stop 122B to contact lower cage 110B before too high a torque is applied to Belleville washers 102B.

Lower cage 110B is fastened to backbone 118B and such forms of fastening may include the use of clinch nuts, clamps, rivets, bolts, welds, adhesives, and other various forms of mechanical and non-mechanical fasteners. In the present embodiment, a bottom part of lower cage 110B is clamped to backbone 118B. The bottom part of lower cage 110B has been deformed by a tool to fit in a hole extending through backbone 118B.

Figure 7:
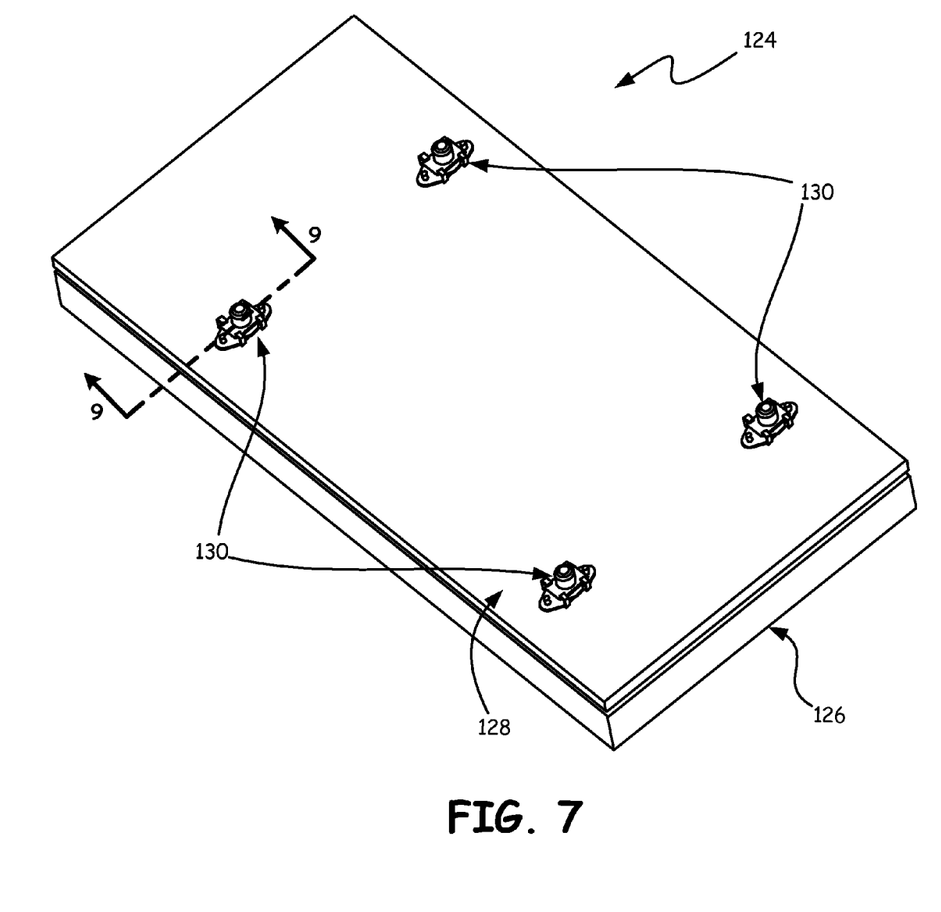
FIG. 7 is a perspective view of a thermally insulating exhaust panel.

FIG. 7 is a perspective view of exhaust panel 124. Exhaust panel 124 includes flow path side 126, back structure 128, and nut plate assemblies 130. Exhaust panel 124 provides an example of a thermally insulating exhaust panel that can be used in an exhaust system of an engine. As mentioned above, depending on the design and materials of exhaust panel 124, the spring rate of nut plate assemblies 130 can be adjusted to account for fracturing and/or cracking thresholds of the materials used for flow path side 126 and back structure 128. Exhaust panel 124 can be used as an engine component included in a gas turbine engine or in other types of engines.

Figure 8:
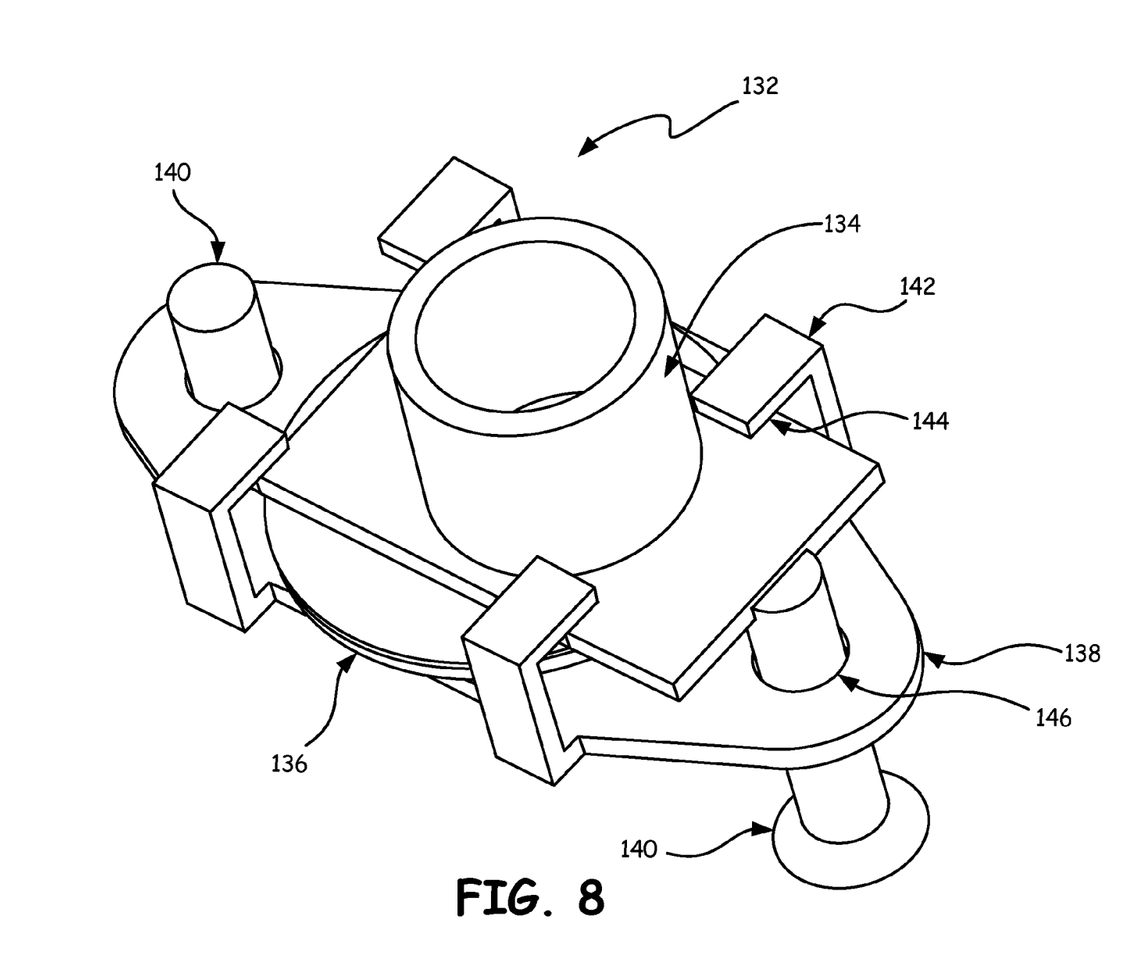
FIG. 8 is a perspective view of a nut plate assembly according to a seventh embodiment.

FIG. 8 is a perspective view of nut plate assembly 132 according to a seventh embodiment. Nut plate assembly 132 includes nut 134, Belleville washers 136, base 138, and rivets 140. Base 138 includes base retention tabs 142 with retaining clips 144. Base 138 also includes holes 146 configured to receive rivets 140.

Belleville washers 136 are retained within base retention tabs 142. Base retention tabs 142 engage with nut 134 by clipping retaining clips 144 onto nut 134. Retaining clips 144 clip onto nut 134 by hooking retaining clips 144 with nut 134 to prevent nut 134 from movement away from base 138. A 90 degree angle between base retention tabs 142 and retaining clips 144 allows retaining clips 144 to attach onto the edge of nut 134 to prevent each of nut 134 and base 138 from separating.

In this embodiment, rivets 140 extend above the lateral edges of nut 134 preventing lateral movement of nut 134 relative to base 138. Other permanent or semi-permanent features extending from or affixed to base 138 can also be used to inhibit movement of nut 134 relative to base 138.

Figure 9:
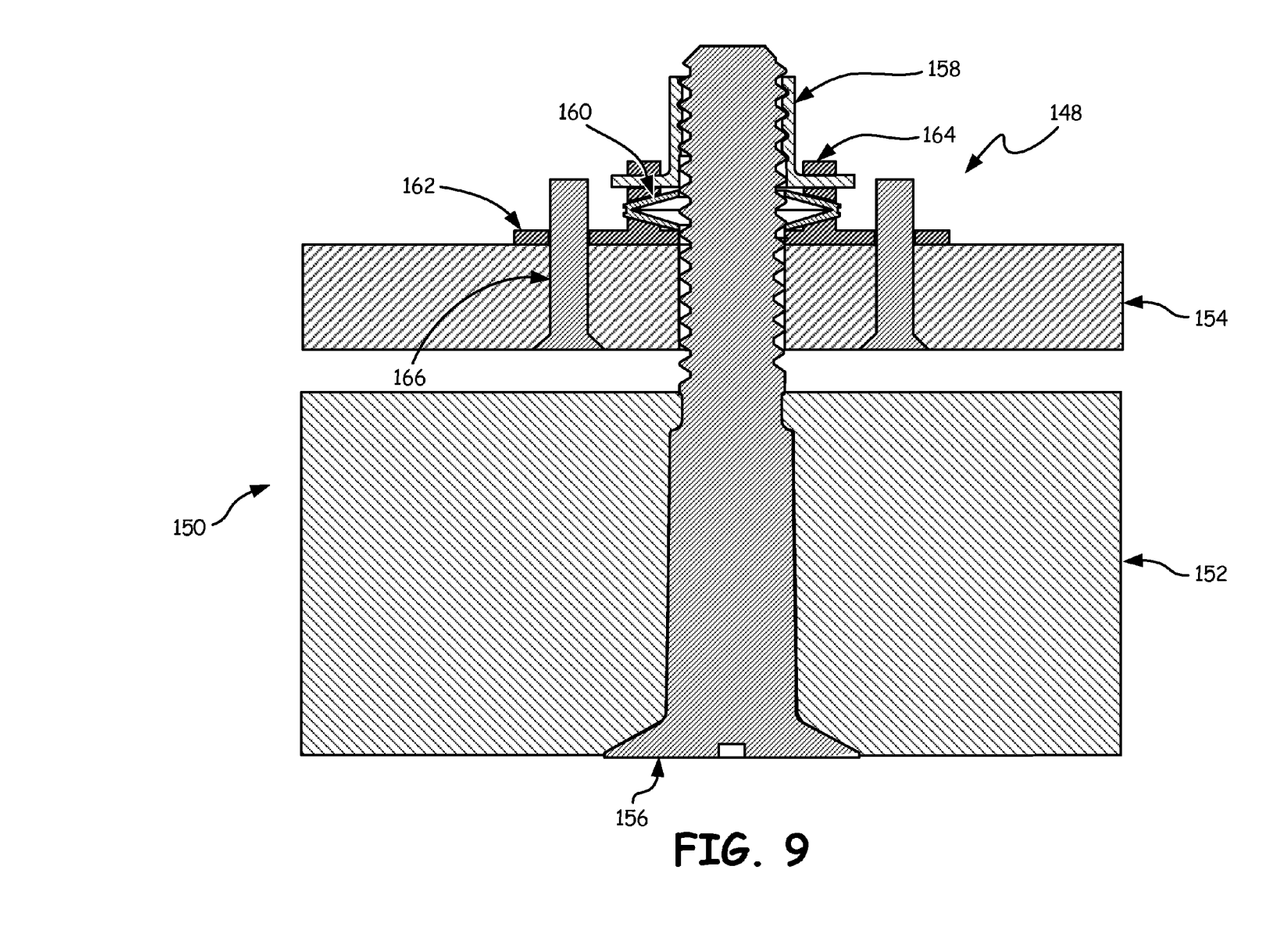
FIG. 9 is a cross-sectional view of a nut plate assembly according to a seventh embodiment.

FIG. 9 is a cross-sectional view of nut plate assembly 148 according to a seventh embodiment. Nut plate assembly is representational of a cross-sectional view taken long 9-9 of one of nut plate assemblies 130 in FIG. 7. Nut plate assembly 148 provides an example of an installed nut plate assembly 132 from FIG. 8.

Nut plate assembly 148 includes exhaust panel 150, flow path side 152, back structure 154, bolt 156, nut 158, Belleville washers 160, and base 162. Base 162 includes base retention tabs 164 and rivets 166. Rivets 166 are used to mechanically fasten base 162 to back structure 154.

Bolt 156 extends through each of flow path side 152, back structure 154, base 162, Belleville washers 160, and nut 158. Bolt 156 is threadably engaged with nut 158. Nut plate assembly 148 compresses Belleville washers 160. The spring rate of Belleville washers 160 can be adjusted by either increasing or decreasing the amount of torque applied to bolt 156. As the torque applied to bolt 156 increases, Belleville washers 160 compress and increase the spring rate of Belleville washers 160. As the torque applied to bolt 156 decreases, Belleville washers 160 decompress and decrease the spring rate of Belleville washers 160.

A specific spring rate of Belleville washers 160 can be selected by varying the conical slant, inner diameter, outer diameter, material, and/or thickness of each of Belleville washers 160. The spring rate of Belleville washers 160 can also be adjusted by situating Belleville washers 160 in any one of series, parallel, or in a combination of series and parallel configurations. The number of washers included in Belleville washers 160 can also be varied to adjust the spring rate of Belleville washers 160. Belleville washers 160 include two Belleville washers in a series relationship such that Belleville washers 160 face the opposite direction. The configuration of Belleville washers 160 could be changed to include a parallel relationship, where the individual washers of Belleville washers 160 would face the same direction. Additionally, more than two individual washers could be included in Belleville washers 160, and could be configured in any one of series, parallel, or in a combination of series and parallel configurations.

Exhaust panel 150 provides an additional example of a thermally insulating exhaust panel that can be used in an exhaust system of an engine. As mentioned above, depending on the design and materials of exhaust panel 150, the spring rate of nut plate assembly 148 can be adjusted to account for fracturing and/or cracking thresholds of the materials used for flow path side 152 and back structure 154.

Discussion of Possible Embodiments

The following are non-exclusive descriptions of possible embodiments of the present disclosure.

An apparatus may include a nut plate. A plurality of retention tabs may be integrally attached to the nut plate. A spring assembly may be contained within the plurality of retention tabs, wherein the spring assembly may include at least one Belleville washer. A nut may be retained by the retention tabs.

The apparatus of the preceding paragraph can optionally include, additionally and/or alternatively, any one or more of the following features, configurations and/or additional components:

a further embodiment of the foregoing apparatus, wherein the spring assembly may include a plurality of Belleville washers;

a further embodiment of the foregoing apparatus, wherein the spring assembly may be located between the nut and the nut plate;

a further embodiment of the foregoing apparatus, wherein the apparatus may include a bolt containing a threaded portion, wherein the bolt may extend through each of the nut plate, the spring assembly, and the nut, and further wherein the bolt may be threadably engageable with the nut;

a further embodiment of the foregoing apparatus, wherein the retention tabs may include a first set of retaining clips that engage with the nut;

a further embodiment of the foregoing apparatus, wherein the nut may include a second set of retaining clips that engage with the first set of retaining clips;

a further embodiment of the foregoing apparatus, wherein the nut may include a stop extending from the nut, wherein the length of the stop may be configured to touch the nut plate when a specific level of torque is applied to the bolt, and further wherein the stop may prevent over-compression of the spring assembly past a specific amount of compression;

a further embodiment of the foregoing apparatus, wherein the nut plate may include a base mechanically fastened to an engine component; and a further embodiment of the foregoing apparatus, wherein the engine component may include an exhaust panel of a gas turbine engine.

A nut plate assembly may include a nut plate. A plurality of retention tabs may be integrally attached to the nut plate. A spring assembly may be contained within the plurality of retention tabs, wherein the spring assembly may include at least one Belleville washer. A plurality of retaining clips may extend from the retention tabs. A nut may be retained by the retention tabs. A bolt may be capable of extending through each of the nut plate, the spring assembly, and the nut, and further wherein the bolt may be threadably engageable with the nut.

The nut plate assembly of the preceding paragraph can optionally include, additionally and/or alternatively, any one or more of the following features, configurations and/or additional components:

a further embodiment of the foregoing nut plate assembly, wherein the spring assembly may include a plurality of Belleville washers;

a further embodiment of the foregoing nut plate assembly, wherein the spring assembly may be located between the nut and the nut plate;

a further embodiment of the foregoing nut plate assembly, wherein the plurality of retaining clips may engage with the nut;

a further embodiment of the foregoing nut plate assembly, wherein the nut may include a second set of retaining clips that engage with the plurality of retaining clips extending from the retention tabs;

a further embodiment of the foregoing nut plate assembly, wherein the nut may include a stop extending from the nut, wherein the length of the stop may be configured to touch the nut plate when a specific level of torque is applied to the bolt, and further wherein the stop may prevent over-compression of the spring assembly past a specific amount of compression;

a further embodiment of the foregoing nut plate assembly, wherein the nut plate may include a base mechanically fastened to an engine component; and a further embodiment of the foregoing nut plate assembly, wherein the engine component may include an exhaust panel of a gas turbine engine.

While the disclosure has been described with reference to an exemplary embodiment(s), it will be understood by those skilled in the art that various changes may be made and equivalents may be substituted for elements thereof without departing from the scope of the disclosure. For example, any of the spring assembles discussed herein can optionally include a smaller or larger number of Belleville washers, as well as varying orientations of the Belleville washers so as to vary the performance characteristics of the nut plate assembly. In addition, many modifications may be made to adapt a particular situation or material to the teachings of the disclosure without departing from the essential scope thereof. Therefore, it is intended that the disclosure not be limited to the particular embodiment(s) disclosed, but that the disclosure will include all embodiments falling within the scope of the appended claims.

The invention claimed is:

1. An apparatus comprising:
a nut plate, wherein the nut plate includes a base mechanically fastened to an engine component;
a plurality of retention elements integrally attached to the nut plate;
a spring assembly contained within the plurality of retention elements, wherein the spring assembly comprises at least one Belleville washer and is located between the nut and the nut plate;
a nut retained by the plurality of retention elements;
a bolt containing a threaded portion, wherein the bolt extends through each of the nut plate, the spring assembly, and the nut, and further wherein the bolt is threadably engaged with the nut.

2. The apparatus of claim 1, wherein the spring assembly comprises a plurality of Belleville washers.

3. The apparatus of claim 1, wherein the retention elements include a first set of retaining clips that engage with the nut.

4. The apparatus of claim 3, wherein the nut includes a second set of retaining clips that engage with the first set of retaining clips.

5. The apparatus of claim 1, wherein the nut comprises a stop extending from the nut, wherein the length of the stop is configured to touch the nut plate when a specific level of torque is applied to the bolt, and further wherein the stop prevents over-compression of the spring assembly past a specific amount of compression.

6. The apparatus of claim 1, wherein the engine component includes an exhaust panel of a gas turbine engine.

7. The apparatus of claim 1 further wherein:
the nut plate comprises:
at least one of a base and a lower cage; and
the retention elements comprise:
at least one of retention tabs and cage arms.

8. A nut plate assembly comprising:
a nut plate, wherein the nut plate includes a base mechanically fastened to an engine component;
a plurality of retention elements integrally attached to the nut plate;
a spring assembly contained within the plurality of retention elements, wherein the spring assembly comprises at least one Belleville washer;
a plurality of retaining clips extending from the retention elements;
a nut retained by the plurality of retaining clips; and
a bolt extending through each of the nut plate, the spring assembly, and the nut, wherein the bolt is threadably engaged with the nut.

9. The nut plate assembly of claim 8, wherein the spring assembly comprises a plurality of Belleville washers.

10. The nut plate assembly of claim 8, wherein the spring assembly is located between the nut and the nut plate.

11. The nut plate assembly of claim 8, wherein the plurality of retaining clips engage with the nut.

12. The nut plate assembly of claim 11, wherein the nut includes a second set of retaining clips that engage with the plurality of retaining clips extending from the retention elements.

13. The nut plate assembly of claim 8, wherein the nut comprises a stop extending from the nut, wherein the length of the stop is configured to touch the nut plate when a specific level of torque is applied to the bolt, and further wherein the stop prevents over-compression of the spring assembly past a specific amount of compression.

14. The nut plate assembly of claim 8, wherein the engine component includes an exhaust panel of a gas turbine engine.

15. The apparatus of claim 8, wherein the retention elements comprise:
the nut plate comprises:
at least one of a base and a lower cage; and
the retention elements comprise:
at least one of retention tabs and cage arms.

* * * * *